US011146179B2

(12) United States Patent
Yamazaki et al.

(10) Patent No.: US 11,146,179 B2
(45) Date of Patent: Oct. 12, 2021

(54) POWER CONVERSION DEVICE, POWER CONVERSION SYSTEM, AND POWER CONVERSION METHOD

(71) Applicant: KABUSHIKI KAISHA YASKAWA DENKI, Kitakyushu (JP)

(72) Inventors: Akira Yamazaki, Fukuoka (JP); Kentaro Inomata, Fukuoka (JP); Masato Higuchi, Fukuoka (JP)

( * ) Notice: Subject to any disclaimer, the term of this patent is extended or adjusted under 35 U.S.C. 154(b) by 0 days.

(21) Appl. No.: 16/795,594

(22) Filed: Feb. 20, 2020

(65) Prior Publication Data

US 2020/0280258 A1  Sep. 3, 2020

(30) Foreign Application Priority Data

Feb. 28, 2019  (JP) .............................. JP2019-035700

(51) Int. Cl.
*H02M 5/458*  (2006.01)
*H02M 7/493*  (2007.01)
*H02M 1/00*  (2006.01)

(52) U.S. Cl.
CPC ........... *H02M 5/458* (2013.01); *H02M 7/493* (2013.01); *H02M 1/0025* (2021.05)

(58) Field of Classification Search
CPC .. H02M 1/0025; H02M 5/458; H02M 5/4585; H02M 7/493; H02M 7/539; H02M 7/5395
See application file for complete search history.

(56) References Cited

U.S. PATENT DOCUMENTS 9,935,465 B2 *  4/2018  Inoue ...................... H02J 3/381
10,848,068 B2 *  11/2020  Iyasu .................. H02M 3/3376

| 2015/0092462 | A1 * | 4/2015  | Ohori ..................... H02M 7/44 363/71 |
| 2016/0211771 | A1 * | 7/2016  | Ichihara .............. H02M 7/5395 |
| 2017/0353127 | A1 * | 12/2017 | Kouno .................. H02M 7/493 |
| 2020/0144930 | A1 * | 5/2020  | Inomata ................. H02M 1/38 |
| 2020/0204057 | A1 * | 6/2020  | Kato ..................... H02M 1/126 |
| 2020/0244096 | A1 * | 7/2020  | Tabuchi ........... H02M 3/33584 |

FOREIGN PATENT DOCUMENTS

| JP | H5-184154 | 7/1993 |
| JP | 2009-153311 | 7/2009 |
| JP | 2015-144534 | 8/2015 |
| WO | 2016/035217 | 3/2016 |

* cited by examiner

*Primary Examiner* — Fred E Finch, III

(74) *Attorney, Agent, or Firm* — Soei Patent & Law Firm

(57) ABSTRACT

A device includes: a first power conversion circuitry configured to convert primary-side power into secondary-side power; and a control circuitry configured to: generate a command value associated with the secondary-side power; calculate a limited command value by modifying the command value so that the command value is equal to or less than a secondary-side limit, wherein the first power conversion circuitry is controlled based on the limited command value; transmit the limited command value to a second power conversion device comprising a second power conversion circuitry connected in parallel to the first power conversion circuitry; receive, from the second power conversion device, information indicating an adjustment value, wherein the adjustment value is added to the limited command value for controlling the second power conversion circuitry; and modify the secondary-side limit based on a difference between a primary-side limit associated with the primary-side power and the adjustment value.

29 Claims, 8 Drawing Sheets

POWER CONVERSION DEVICE, POWER CONVERSION SYSTEM, AND POWER CONVERSION METHOD

CROSS-REFERENCE TO RELATED APPLICATION

This application is based upon and claims the benefit of priority from Japanese Patent Application No. P2019-035700, filed on Feb. 28, 2019, the entire contents of which are incorporated herein by reference.

BACKGROUND

Japanese Unexamined Patent Publication No. H5-184154 discloses, in a parallel converter system for operating a plurality of AC output converters in parallel, a parallel operation control device for controlling output voltages of the converters so that cross current (circulating current) flowing between the converters is suppressed.

SUMMARY

A power conversion device according to one aspect of the present disclosure includes a first power conversion circuitry having a primary side and a secondary side configured to convert primary-side power into secondary-side power; and a control circuitry configured to: generate a command value associated with the secondary-side power; calculate a limited command value by modifying the command value so that the command value is equal to or less than a secondary-side limit, wherein the first power conversion circuitry is controlled based on the limited command value; transmit the limited command value to a second power conversion device comprising a second power conversion circuitry connected in parallel to the first power conversion circuitry; receive, from the second power conversion device, information indicating an adjustment value, wherein the adjustment value is added to the limited command value for controlling the second power conversion circuitry; and modify the secondary-side limit based on a difference between a primary-side limit associated with the primary-side power and the adjustment value.

A power conversion system according to another aspect of the present disclosure includes the power conversion device and the second power conversion device described above.

A power conversion method according to still another aspect of the present disclosure includes: generating a command value associated with the secondary-side power; calculating a limited command value by modifying the command value so that the command value is equal to or less than a secondary-side limit, wherein the first power conversion circuitry is controlled based on the limited command value; transmitting the limited command value to a second power conversion device comprising a second power conversion circuitry connected in parallel to the first power conversion circuitry; receiving, from the second power conversion device, information indicating an adjustment value, wherein the adjustment value is added to the limited command value for controlling the second power conversion circuitry; and modifying the secondary-side limit based on a difference between a primary-side limit associated with the primary-side power and the adjustment value.

DETAILED DESCRIPTION

Figure 1:
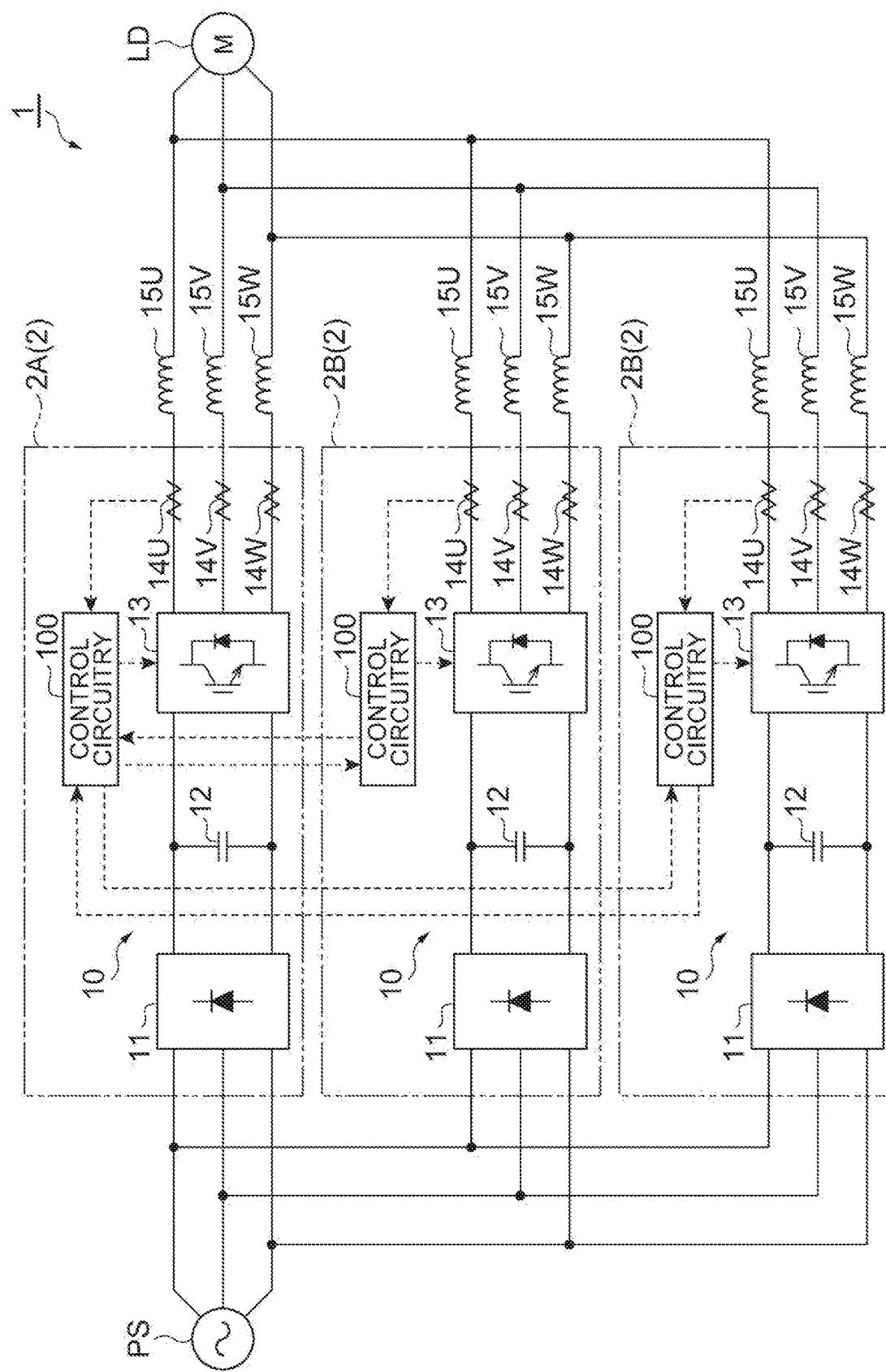
FIG. 1 is a schematic diagram illustrating a schematic configuration of an example power conversion system.

In the following description, with reference to the drawings, the same elements or elements having the same functions are denoted by the same reference numerals, and redundant description is omitted.

Power Conversion System

An example power conversion system 1 shown in FIG. 1 may comprise a parallel operating system that supplies power to the same load by a plurality of power conversion devices. The power conversion system 1 includes a master device 2A (first power conversion device) that converts a power of primary side (for example, power-source-side) into a power of secondary side (for example, load-side) based on a command value generated by the master device 2A, and a slave device 2B (second power conversion device) that converts a power of primary side into a power of secondary side based on the command value generated by the master device 2A. As illustrated in FIG. 1, the power conversion system 1 may include a plurality of slave devices 2B.

Each of the master device 2A and the slave device 2B includes a power conversion circuitry 10 (first power conversion circuitry, first power conversion unit). The power conversion circuitry 10 has a primary side and a secondary side. For example the primary side is connected to the power source 10 and the secondary side is connected to the load LD. The power conversion circuitry 10 (master power conversion circuitry, master power conversion unit) of the master device 2A converts a primary-side power on the power source PS side to a secondary-side power on the load LD side. The power conversion circuitry 10 (slave power conversion circuitry, slave power conversion unit) of the slave device 2B is connected in parallel to the power conversion circuitry 10 of the master device 2A, and converts power on the power source PS side to power on the load LD side. The type of power on the power source PS side and the type of power on the load LD side may be DC power or AC power. As an example, FIG. 1 shows a configuration in which power on the power source PS side and power on the load LD side are both three-phase AC power. An example power source PS includes a power system and a generator. An example load LD includes an electric motor, a heater, and a light source. The master device 2A and the slave device 2B may be implemented by a power conversion device 2 that can be used as either the master device 2A or the slave device 2B according to user settings.

Hereinafter, an example configuration of the power conversion device 2 will be described. The power conversion device 2 includes the power conversion circuitry 10, a control circuitry 100, current sensors 14U, 14V, and 14W, and inductors 15U, 15V, and 15W. The power conversion circuitry 10 includes a rectifier circuitry 11, a capacitor 12, and an inverter circuitry 13. The rectifier circuitry 11 is a diode bridge circuitry, for example, and converts three-phase AC power on the power source PS side into DC power. The capacitor 12 smooths the voltage of the DC power (hereinafter referred to as "DC bus voltage").

The inverter circuitry 13 converts the DC power into three-phase AC power on the load LD side. The inverter circuitry 13 has a plurality of (for example, six) switching elements, and converts DC power into three-phase AC power by switching on/off of the switching elements. The switching element is, for example, a power Metal Oxide Semiconductor Field Effect Transistor (MOSFET), an Insulated Gate Bipolar Transistor (IGBT), or the like, and switches on/off according to a gate drive signal.

Note that the configuration of the power conversion circuitry 10 is merely an example. The power conversion circuitry 10 may include additional configurations in which the power on the power source PS side can be converted into the power on the load LD side. For example, the rectifier circuitry 11 may be a PWM converter. Also, the DC buses of the power conversion circuitry 10 that are parallel to each other may be connected. Furthermore, the power conversion circuitry 10 may be a matrix converter that converts AC power on the power source PS side into AC power on the load LD side without power conversion from AC into DC.

The current sensors 14U, 14V, and 14W detect a current flowing between the inverter circuitry 13 and the load LD. For example, the current sensors 14U, 14V, and 14W detect U-phase, V-phase, and W-phase AC currents, respectively. The detection values of the current sensors 14U, 14V, and 14W are used to control the power conversion circuitry 10 by the control circuitry 100. The inductors 15U, 15V, and 15W suppress a circulating current between the power conversion circuitry 10 connected in parallel to each other. The inductors 15U, 15V, and 15W may be omitted by using the inductance component of the wiring between the inverter circuitry 13 and the load LD.

The control circuitry 100 is configured to select a master mode control or a slave mode control in response to a user-input. The power conversion device 2 operates as the master device 2A in the master mode control. The power conversion device 2 operates as the slave device 2B in the slave mode control.

The master mode control comprises: generating a command value associated with the secondary-side power; calculating a limited command value by modifying the command value so that the command value is equal to or less than an upper limit (a secondary-side limit); transmitting the limited command value to the slave device 2B (another device); receiving, from the slave device 2B, correction information indicating a slave-side adjustment value (slave adjustment value) which is an adjustment value added to the limited command value in the slave device 2B for controlling the slave power conversion circuitry 10; and modifying the upper limit based on a difference between a primary-side limit associated with the primary-side power and the slave-side adjustment value. The first power conversion circuitry 10 (the master power conversion circuitry 10) is controlled based on the limited command value. The slave-side adjustment value may be added to the limited command value in the slave device 2B in order to suppress the circulating current between the slave power conversion circuitry 10 and the master power conversion circuitry 10. The upper limit may be modified so as to reduce a difference between a margin of the upper limit for the primary-side limit and the other-device adjustment value. The margin is a difference between the primary-side limit and the upper limit.

The slave mode control comprises: receiving the limited command value (master command value) transmitted from the master device 2A, calculating a slave command value by adding the slave-side adjustment value to the master command value; and transmitting information indicating the slave-side adjustment value to the master device 2A. The first power conversion circuitry 10 (the slave power conversion circuitry 10) is controlled based on the slave command value.

Figure 2:
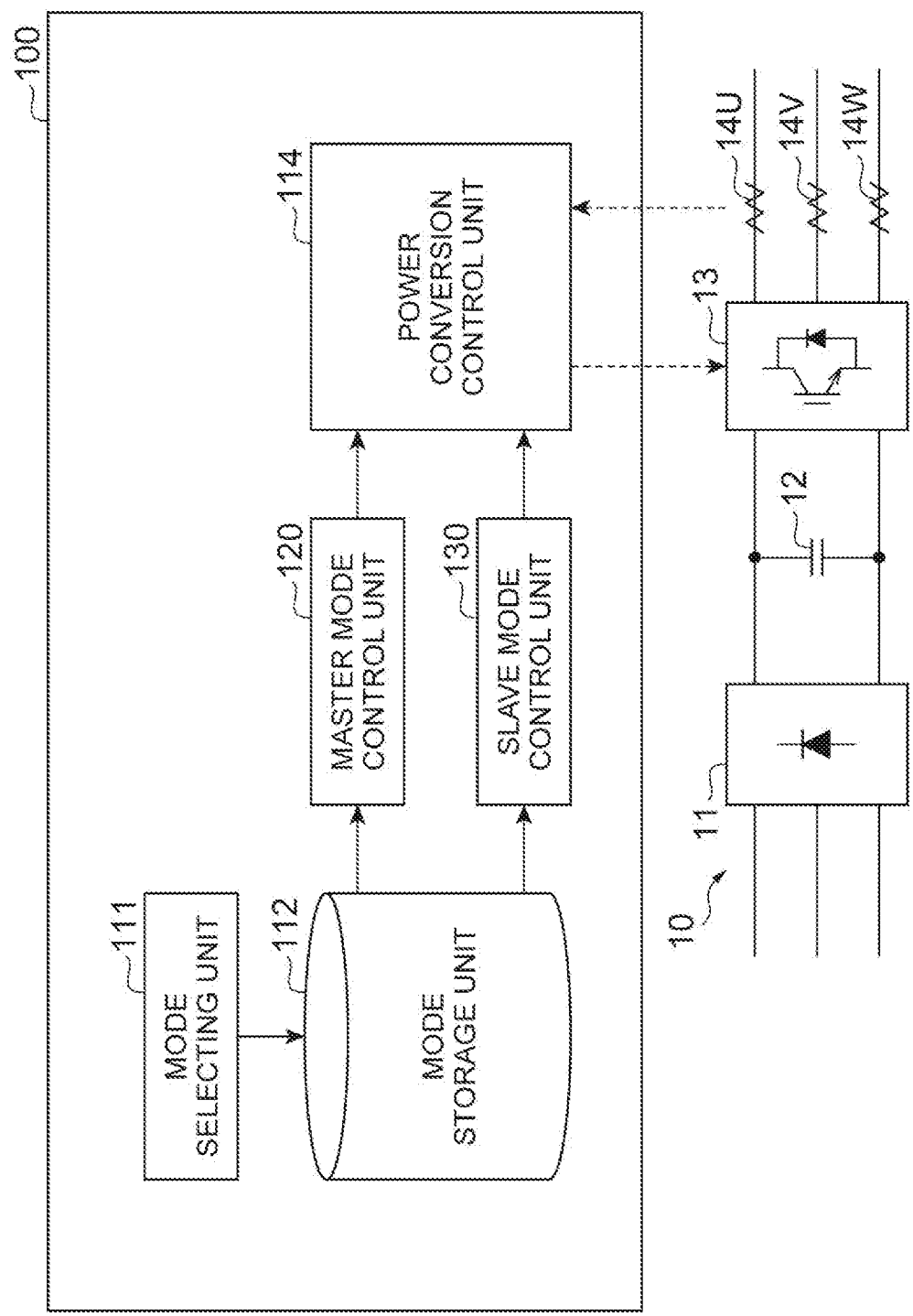
FIG. 2 is a block diagram illustrating a functional configuration of an example control circuitry.

As shown in FIG. 2, the control circuitry 100 includes, as a functional configuration (hereinafter referred to as a "functional module"), a power conversion control unit 114, a master mode control unit 120, a slave mode control unit 130, a mode selecting unit 111, and a mode storage unit 112.

The power conversion control unit 114 controls the power conversion circuitry 10 such that power on the power source PS side (the primary-side power) is converted into power on the load LD side (the secondary-side power) according to a command value. For example, the power conversion control unit 114 controls the power conversion circuitry 10 such that power on the power source PS side is converted into power on the load LD side according to the command value. The command value may comprise a target value of power on the load LD side. Examples of the command value include a voltage command value for space vector control of the power conversion circuitry 10. The command value may be a modulation factor command value that expresses the magnitude of the voltage command value in a modulation factor.

The modulation factor is the ratio of the voltage command value to the DC bus voltage. For example, the power conversion control unit 114 switches on/off of the switching element of the inverter circuitry 13 so that the output voltage of the inverter circuitry 13 follows the command value.

The master mode control unit 120 is configured to control the first power conversion circuitry 10 based on the limited command value. For example the master mode control unit 120 generates a command value for the master mode control (for example, a command value for operating the power conversion device 2 as the master device 2A), and outputs the command value to the power conversion control unit 114. The master mode control unit 120 performs the master mode control via the power conversion control unit 114.

In some examples, the master mode control unit 120 calculates a target current value for causing the load LD to follow a control target value acquired from a host controller or the like, and calculates a command value for decreasing a deviation between the target current value and the current detection value (for example, detection value of the current sensors 14U, 14V, and 14W) by proportional calculation, proportional-integral calculation, or proportional-integral-derivative calculation. The control target value may include a speed command value for an electric motor that is an example of the load LD.

Further, the master mode control unit 120 limits the command value to (or below) a prescribed upper limit, transmits the command value limited to (or below) the upper limit to the slave device 2B, receives, from the slave device 2B, correction information indicating the other-device adjustment value which is the adjustment value added to the command value in the slave device 2B in order to suppress the circulating current between the power conversion circuitry 10 of the power conversion device 2 and the power conversion circuitry 10 of the slave device 2B, and changes the upper limit so as to reduce a difference between a margin of the upper limit for a maximum command value the power conversion circuitry 10 can follow and the other-device adjustment value.

The slave mode control unit 130 is configured to control the first power conversion circuitry 10 based on the master command value generated in the master power conversion device 2A. For example the slave mode control unit 130 generates a command value for the slave mode control (for example, a command value for operating the power conversion device 2 as the slave device 2B), and outputs the command value to the power conversion control unit 114. The slave mode control unit 130 performs the slave mode control via the power conversion control unit 114.

The slave mode control unit 130 receives the limited command value transmitted from the master mode control unit 120 of the master device 2A, and calculates the slave command value by adding the slave-side adjustment value to the limited command value. Further, the slave mode control unit 130 transmits information indicating the slave-side adjustment value to the master mode control unit 120 of the master device 2A.

The mode selecting unit 111 selects control by the master mode control unit 120 or control by the slave mode control unit 130 according to a user-input. For example, the mode selecting unit 111 sets the control mode of the power conversion circuitry 10 to either a master mode or a slave mode according to a user-input, and stores the setting result in the mode storage unit 112. When the control mode stored in the mode storage unit 112 is the master mode, the master mode control unit 120 generates a command value and outputs the command value to the power conversion control unit 114. When the control mode stored in the mode storage unit 112 is the slave mode, the slave mode control unit 130 generates a command value and outputs the command value to the power conversion control unit 114.

Figure 3:
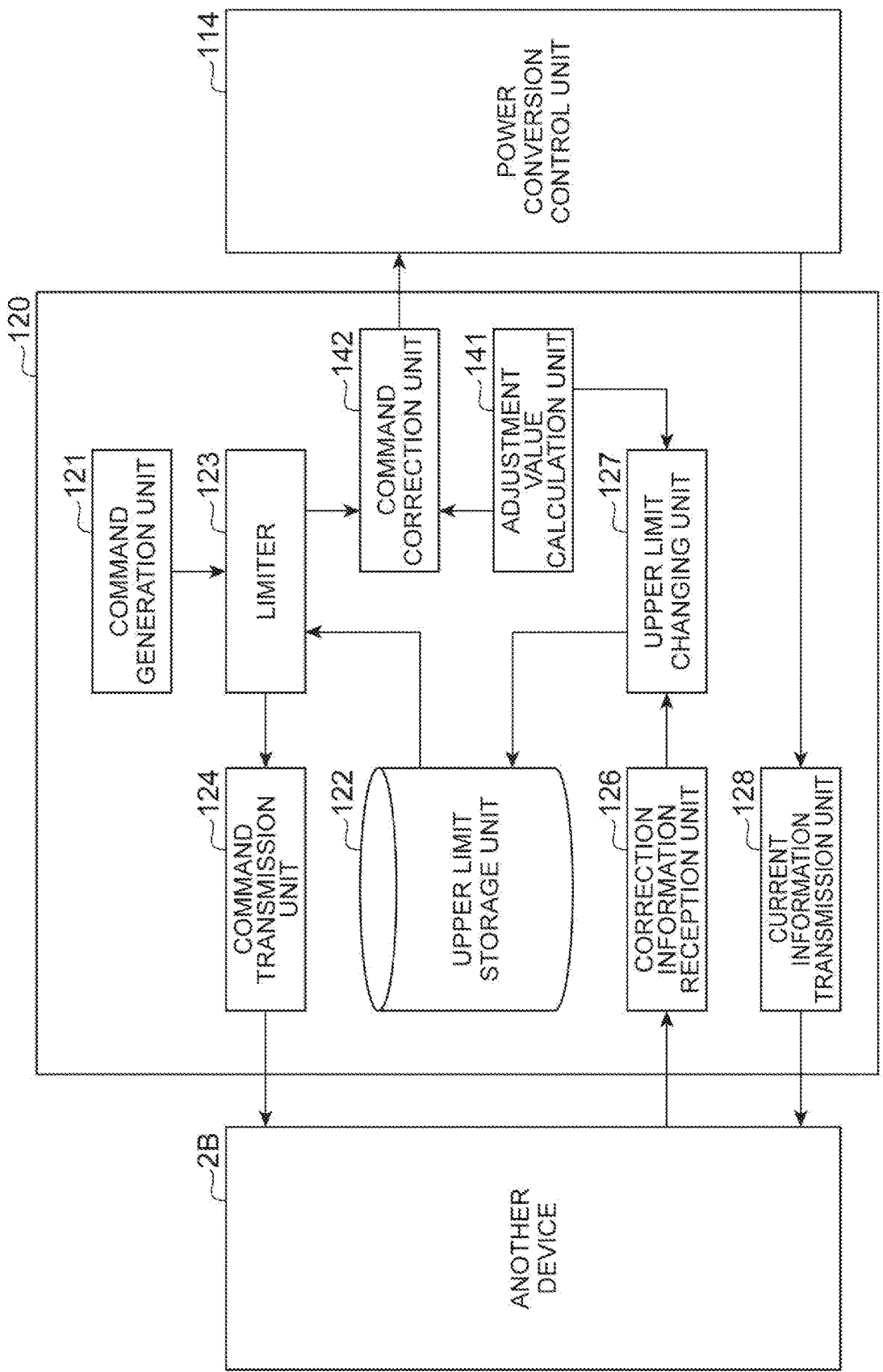
FIG. 3 is a block diagram illustrating a functional configuration of an example master mode control unit.

Hereinafter, the configurations of the master mode control unit 120 and the slave mode control unit 130 will be described in more detail. As shown in FIG. 3, the master mode control unit 120 includes a command generation unit 121, an upper limit storage unit 122, a limiter 123, an adjustment value calculation unit 141, a command correction unit 142, a command transmission unit 124, a correction information reception unit 126, an upper limit changing unit 127, and a current information transmission unit 128. In some examples, the master mode control unit 120 controls the power conversion circuitry 10 of the power conversion device 2 using these functional modules.

The command generation unit 121 generates the command value associated with the secondary-side power. For example the command generation unit 121 generates a command value for the first power conversion circuitry 10. The upper limit storage unit 122 stores the upper limit set in advance for the command value. The limiter 123 calculates the limited command value by modifying the command value so that the command value is equal to or less than the upper limit (the secondary-side limit) The first power conversion circuitry 10 is controlled based on the limited command value. For example, the limiter 123 limits the command value to or below the upper limit stored in the upper limit storage unit 122 and outputs the limited command value to the command correction unit 142. For example, the limiter 123 cuts a portion of the command value generated by the command generation unit 121 that exceeds the upper limit. The limiter 123 may output the upper limit to the command generation unit 121 and cause the command generation unit 121 to limit the command value. In this case, the command generation unit 121 calculates the limited command value and outputs the limited command value to the command correction unit 142.

The adjustment value calculation unit 141 (self adjustment value calculation unit) calculates a self adjustment value (hereinafter referred to as a "master-side adjustment value") based on a current (hereinafter referred to as a "self-device current") generated in the secondary side by the first power conversion circuitry 10. For example, the adjustment value calculation unit 141 calculates the master-side adjustment value including a correction component for dead time compensation, a correction component for common mode (zero-phase) current suppression, and the like. The command correction unit 142 calculate an adjusted command value by adding the master-side adjustment value calculated by the adjustment value calculation unit 141 to the limited command value (the command value limited by the limiter 123) to correct the command value for the first power conversion circuitry 10, and outputs the adjusted command value to the power conversion control unit 114 so that the first power conversion circuitry 10 is controlled based on the adjusted command value. The addition here includes addition of a negative value (that is, subtraction of an absolute value).

The command transmission unit 124 transmits the limited command value (command value before correction by the command correction unit 142) to the slave device 2B. When the power conversion system 1 includes a plurality of slave devices 2B, the command transmission unit 124 may transmit the limited command value to the plurality of slave devices 2B.

The correction information reception unit 126 receives, from the slave device 2B, information indicating the slave-side adjustment value added in the slave device 2B to the limited command value (the command value transmitted by the command transmission unit 124) for controlling the second power conversion circuitry 10. When the power conversion system 1 includes a plurality of slave devices 2B, the correction information reception unit 126 may receive information indicating slave-side adjustment values from the plurality of slave devices 2B. Each of the slave-side adjustment values is a value added to the limited command value for controlling the power conversion circuitry 10 of one of the plurality of slave devices 2B. The information indicating the slave-side adjustment value may be any information as long as it enables identification of the slave-side adjustment value. For example, the information indicating the slave-side adjustment value may be numerical information indicating the magnitude of the slave-side adjustment value. The information indicating the slave-side adjustment value may be numerical information indicating the magnitude of the command value obtained by adding the slave-side adjustment value (hereinafter referred to as a "corrected command value"). In this case, the slave-side adjustment value can be identified by subtracting the command value before correction (command value generated by the command generation unit 121) from the corrected command value.

The upper limit changing unit 127 modifies the upper limit based on the difference between the primary-side limit associated with the primary-side power and the slave-side adjustment value. For example the upper limit changing unit 127 modifies (changes) the upper limit so as to reduce a difference between the margin of the upper limit for the primary-side limit and the slave-side adjustment value. The primary-side limit may be a maximum command value the power conversion circuitry 10 can follow. For example, when the command value is a voltage command value, the maximum command value is a DC bus voltage value. DC bus voltage is associated with the primary-side power. When the command value is a modulation factor command value, the maximum command value is 1. Note that the maximum command value may be smaller than the DC bus voltage value (which is 1 when the command value is the modulation factor command value) due to restrictions depending on the conditions (allowable voltage in driving the load LD, current distortion conditions) under which the power conversion device 2 is used.

For example, the upper limit changing unit 127 calculates the upper limit so as to reduce the difference between the margin of the upper limit for the maximum command value and the slave-side adjustment value, and overwrites the calculated result over the upper limit stored in the upper limit storage unit 122. For example, when the margin is greater than the slave-side adjustment value, the upper limit changing unit 127 increases the upper limit so that the difference between the margin and the slave-side adjustment value is reduced. On the other hand, when the margin is smaller than the slave-side adjustment value, the upper limit changing unit 127 decreases the upper limit so that the difference between the slave-side adjustment value and the margin is reduced.

As an example, the upper limit changing unit 127 may calculate the upper limit so that the margin of the upper limit for the maximum command value matches the slave-side adjustment value. The upper limit changing unit 127 may calculate the upper limit so that the margin of the upper limit for the maximum command value matches a value obtained by adding a predetermined margin to the slave-side adjustment value. The upper limit changing unit 127 may modify the upper limit based on a comparison between the slave-side adjustment value and the master-side adjustment value. The upper limit may be modified based on the difference between the primary-side limit and the slave-side adjustment value when the slave-side adjustment value is greater than the master-side adjustment value. The upper limit may be modified based on a difference between the primary-side limit and the master-side adjustment value when the master-side adjustment value is greater than the slave-side adjustment value. For example, when the master-side adjustment value is greater than the slave-side adjustment value, the upper limit changing unit 127 may calculate the upper limit so as to reduce the difference between the margin and the master-side adjustment value, and when the slave-side adjustment value is greater than the master-side adjustment value, the upper limit changing unit 127 may calculate the upper limit so as to reduce the difference between the margin and the slave-side adjustment value. Thus, calculating the upper limit so as to reduce the difference between the margin and the slave-side adjustment value includes calculating the upper limit so as to reduce the difference between the margin and the slave-side adjustment value only when the slave-side adjustment value is greater than the master-side adjustment value.

When the correction information reception unit 126 receives information indicating the slave-side adjustment values from the plurality of slave devices 2B, the upper limit changing unit 127 may select a maximum value of the slave-side adjustment values as the adjustment value and modifies the upper limit based on the difference between the primary-side limit and the adjustment value. For example the upper limit changing unit 127 may select the maximum value as the adjustment value and change the upper limit so as to reduce the difference between the margin and the slave-side adjustment value.

The upper limit changing unit 127 may be configured to save the initial value of the upper limit in the upper limit storage unit 122 before starting to change the upper limit based on the slave-side adjustment value. For example, the initial value of the upper limit is determined in advance so that the margin is greater than the expected maximum slave-side adjustment value based on past data or the like.

The current information transmission unit 128 transmits information indicating the current generated in the load LD side by the first power conversion circuitry 10 to the slave device 2B. For example, the current information transmission unit 128 transmits the detected current value acquired from the current sensors 14U, 14V, and 14W by the power conversion control unit 114 of the power conversion device 2 to the slave device 2B.

Figure 4:
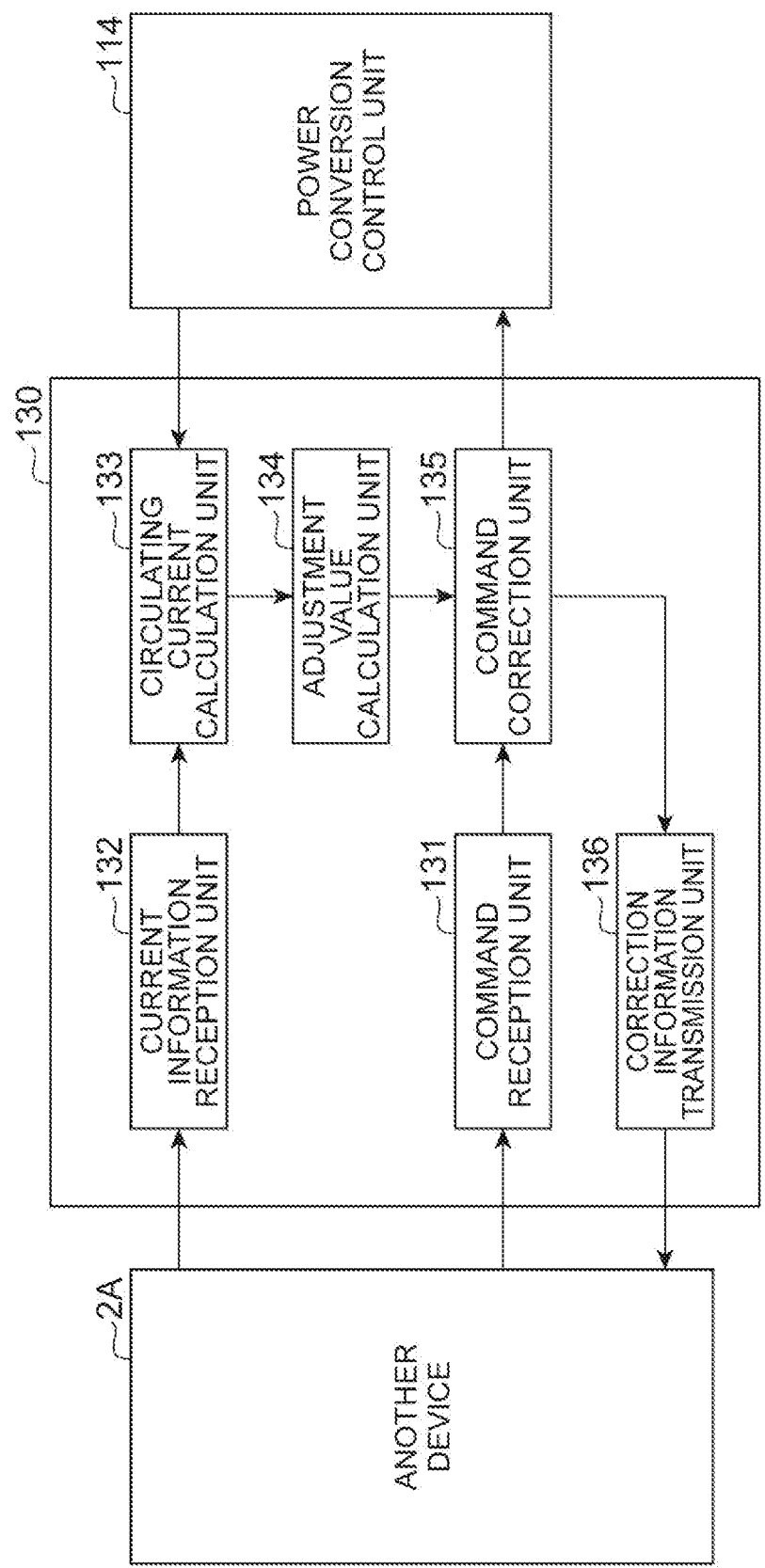
FIG. 4 is a block diagram illustrating a functional configuration of an example slave mode control unit.

As shown in FIG. 4, the slave mode control unit 130 includes a command reception unit 131, a current information reception unit 132, a circulating current calculation unit 133, an adjustment value calculation unit 134, a command correction unit 135, and a correction information transmission unit 136. In some examples, the slave mode control unit 130 controls the power conversion circuitry 10 of the power conversion device 2 using these functional modules.

The command reception unit 131 receives the limited command value (the master command value) from the command transmission unit 124 of the master device 2A as a command value for the power conversion circuitry 10 of the power conversion device 2. The current information reception unit 132 receives master current information indicating a current generated by the master power conversion circuitry 10 in the secondary side (a current flowing through the secondary side of the power conversion circuitry 10 of the master device 2A) from the current information transmission unit 128 of the master device 2A.

The circulating current calculation unit 133 calculates a circulating current based on a difference between a current (hereinafter referred to as a "slave current") generated in the secondary side by the first power conversion circuitry 10 of the power conversion device 2 and a current (hereinafter referred to as a "master current") indicated by the master current information received by the current information reception unit 132. When the direction of flow from the master device 2A to the slave device 2B is defined as the positive direction of the circulating current, the circulating current calculation unit 133 calculates the circulating current by subtracting the slave current from the master current. In contrast, when the direction of flow from the slave device 2B to the master device 2A is defined as the positive direction of the circulating current, the circulating current calculation unit 133 calculates the circulating current by subtracting the master current from the slave current.

The adjustment value calculation unit 134 (slave adjustment value calculation unit) calculates the slave-side adjustment value based on the circulating current calculated by the circulating current calculation unit 133. For example, the adjustment value calculation unit 134 calculates the slave-side adjustment value so that the circulating current is reduced. As an example, when a circulating current from the master device 2A to the slave device 2B is generated, the adjustment value calculation unit 134 calculates the slave-side adjustment value by performing proportional calculation, proportional-integral calculation, proportional-integral-derivative calculation, etc. on the value of the circulating current. The slave-side adjustment value calculated in this way is added to the command value for the power conversion circuitry 10 of the power conversion device 2, whereby the circulating current from the master device 2A toward the slave device 2B is reduced.

The adjustment value calculation unit 134 may calculate the slave-side adjustment value further based on another information indicating the circulating current. For example, the adjustment value calculation unit 134 may calculate the slave-side adjustment value by adding a correction component (for example, correction component for dead time compensation, correction component for common mode (zero phase) current suppression) based on the slave current to a value obtained by performing proportional calculation, proportional-integral calculation, proportional-integral-derivative calculation, etc. on the value of the circulating current.

The command correction unit 135 calculate the slave command value by adding the slave-side adjustment value calculated by the adjustment value calculation unit 134 to the master command value (the command value received by the command reception unit 131), and outputs the slave command value to the power conversion control unit 114 so that the first power conversion circuitry 10 is controlled based on the slave command value. The addition here includes addition of a negative value (that is, subtraction of an absolute value).

The correction information transmission unit 136 transmits information indicating the slave-side adjustment value calculated by the adjustment value calculation unit 134 to the correction information reception unit 126 of the master device 2A. As described above, the information indicating the slave-side adjustment value may be any information as long as it enables identification of the slave-side adjustment value.

Figure 5:
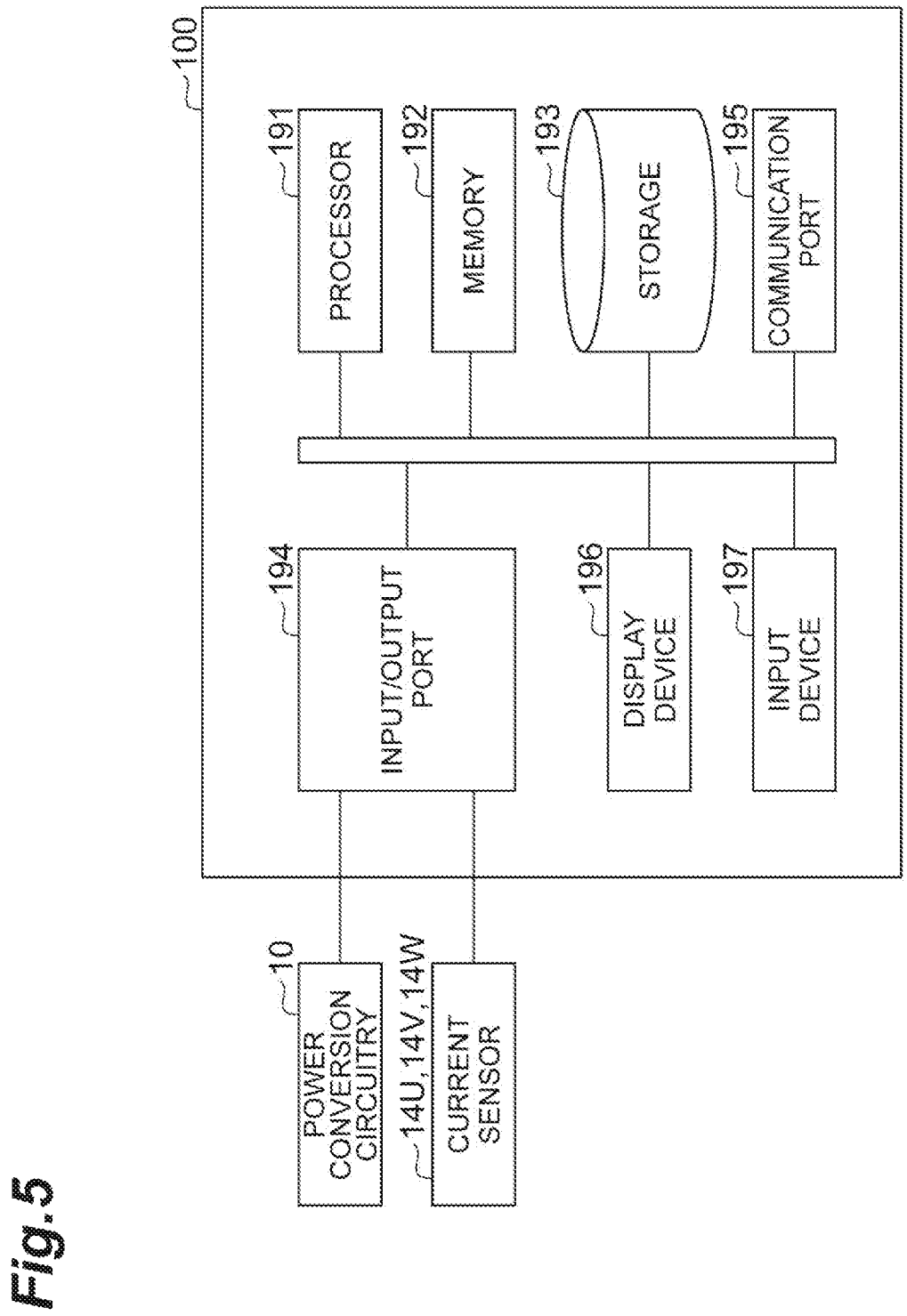
FIG. 5 is a block diagram illustrating an example hardware configuration of the control circuitry.

FIG. 5 is a diagram illustrating a hardware configuration of the control circuitry 100. As shown in FIG. 5, the control circuitry 100 includes one or more processors 191, a memory 192, a storage 193, an input/output port 194, a communication port 195, a display device 196, and an input device 197.

The storage 193 stores a program for causing the control circuitry 100 to select a control from the master mode control and the slave mode control in response to the user-input and to perform the selected control.

This program may be configured to cause the control circuitry 100 to: generate a command value associated with the secondary-side power; calculate the limited command value by modifying the command value so that the command value is equal to or less than the upper limit; transmit the limited command value to the slave device 2B; receive, from the slave device 2B, correction information indicating the slave-side adjustment value; and modify the upper limit based on a difference between the primary-side limit and the slave-side adjustment value.

In addition, when controlling the power conversion circuitry 10 in the slave mode, this program may be configured to cause the control circuitry 100 to: receive the master command value transmitted from the master device 2A, calculate the slave command value by adding the slave-side adjustment value to the master command value; and transmit information indicating the slave-side adjustment value to the master device 2A.

For example, the storage 193 is a storage medium such as at least one hard disk or a non-volatile memory, and the storage 193 stores the program for implementing the functional module of the control circuitry 100.

The memory 192 temporarily stores the program loaded from the storage 193, a calculation result by the processor 191, and the like. The processor 191 executes the program in cooperation with the memory 192. The input/output port 194 inputs and outputs electrical signals between the power conversion circuitry 10 and the current sensors 14U, 14V, and 14W according to an instruction from the processor 191. The communication port 195 communicates information with the communication port 195 of another control circuitry 100 via a wired or wireless communication path in accordance with an instruction from the processor 191. The display device 196 includes, for example, a liquid crystal monitor and is used for displaying information to the user. The input device 197 is a keyboard or the like, for example, and acquires input information input by the user. The display device 196 and the input device 197 may be integrated like a so-called touch panel.

Power Conversion Method

Subsequently, a power conversion control procedure executed by the control circuitry 100 will be described as an example of the power conversion method. This procedure includes a master mode control procedure for controlling the power conversion circuitry 10 in the master mode control in which the power conversion device 2 operates as the master device 2A, a slave mode control procedure for controlling the power conversion circuitry 10 in the slave mode control in which the power conversion device 2 operates as the slave device 2B, and a control mode selecting procedure for selecting the master mode control or the slave mode control in response to a user-input. Each procedure will be described below.

Master Mode Control Procedure

The master mode control procedure includes: generating a command value associated with the secondary-side power; calculating the limited command value by modifying the command value so that the command value is equal to or less than the upper limit; transmitting the limited command value to the slave device 2B; receive, from the slave device 2B, correction information indicating the slave-side adjustment value; and modifying the upper limit based on a difference between the primary-side limit associated with the primary-side power and the slave-side adjustment value.

Figure 6:
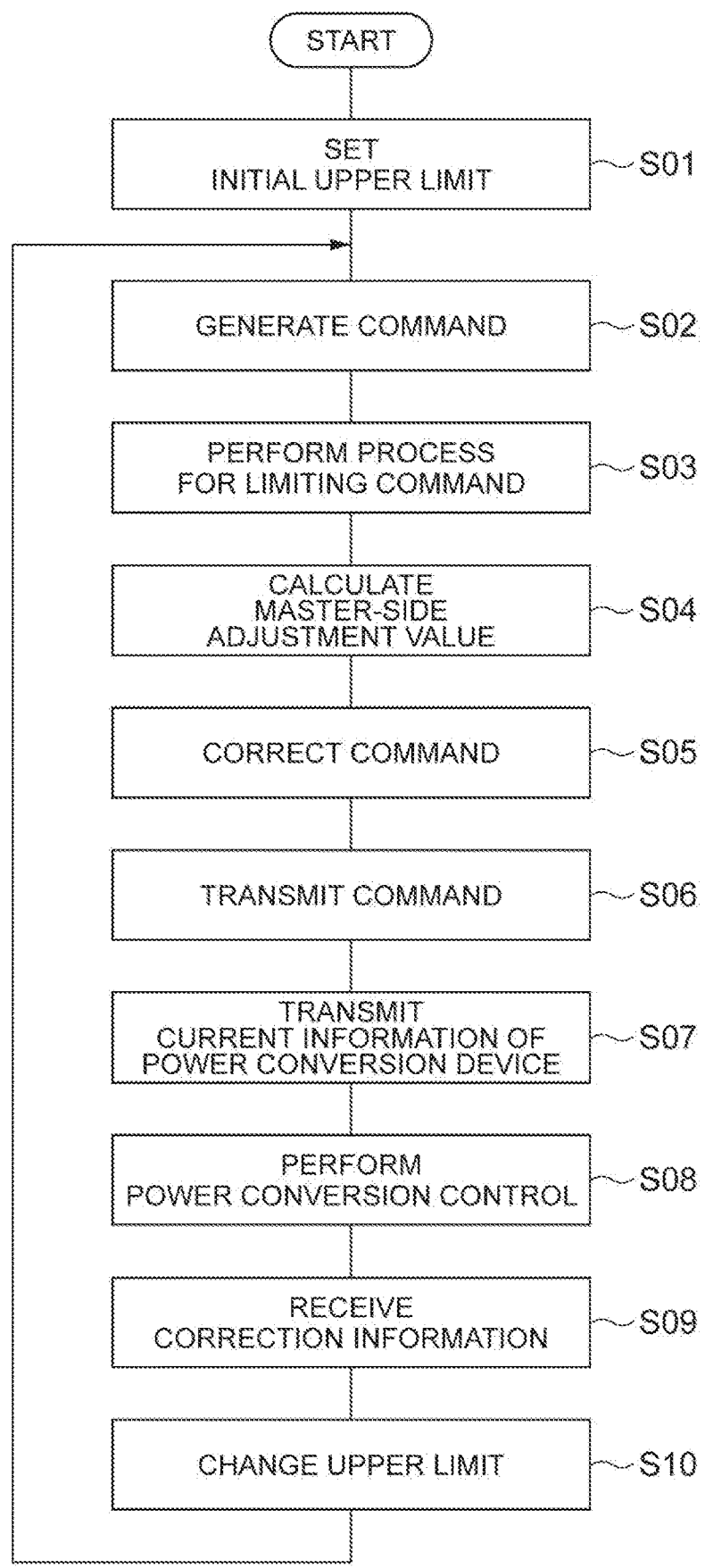
FIG. 6 is a flowchart illustrating an example master mode control procedure.

FIG. 6 is a flowchart illustrating an example master mode control procedure executed by the control circuitry 100. In operation S01, the upper limit changing unit 127 stores the initial value of the upper limit in the upper limit storage unit 122. In operation S02, the command generation unit 121 generates a command value for the power conversion circuitry 10 of the power conversion device 2. In operation S03, the limiter 123 limits the command value generated by the command generation unit 121 to or below the upper limit stored in the upper limit storage unit 122. In operation S04, the adjustment value calculation unit 141 calculates the master-side adjustment value. In operation S05, the command correction unit 142 adds the master-side adjustment value calculated by the adjustment value calculation unit 141 to the limited command value (the command value limited by the limiter 123) to correct the command value for the power conversion circuitry 10 of the power conversion device 2. In operation 506, the command transmission unit 124 transmits the limited command value to the command reception unit 131 of the slave device 2B. In operation 507, the current information transmission unit 128 transmits the detected current value acquired from the current sensors 14U, 14V, and 14W by the power conversion control unit 114 of the power conversion device 2 to the slave device 2B.

In operation S08, the command correction unit 142 outputs the corrected command value to the power conversion control unit 114 of the power conversion device 2. In response to the output of the command value, the power conversion control unit 114 controls the power conversion circuitry 10 such that the power on the power source PS side is converted into the power on the load LD side according to the command value. In operation S09, the correction information reception unit 126 receives, from the slave device 2B, information indicating the slave-side adjustment value added in the slave device 2B to the command value transmitted by the command transmission unit 124.

In operation 510, the upper limit changing unit 127 calculates the upper limit so as to reduce the difference between the margin of the upper limit for the maximum command value and the slave-side adjustment value, and overwrites the calculated result over the upper limit stored in the upper limit storage unit 122. Then, the control circuitry 100 returns the process to operation S02. Thereafter, the control of the power conversion circuitry 10 based on the command value limited by the changed upper limit and the further change of the upper limit based on the slave-side adjustment value in the slave device 2B are repeated.

In some example master mode control procedures, the transmission of the command value in operation S06 may be performed at least between the limitation of the command value in operation S03 and the reception of correction information (information indicating the slave-side adjustment value) in operation S09. For example, the command value may be transmitted after operation S07 or after operation S08. In addition, the transmission of the current information of the power conversion device 2 in operation S08 may be performed at least before the reception of the correction information in operation S09. For example, the current information may be transmitted before the command value is limited in operation S03 or before the command is generated in operation S02.

Slave Mode Control Procedure

The slave mode control procedure includes: receiving the limited command value (master command value) transmitted from the master device 2A, calculating the slave command value by adding the slave-side adjustment value to the master command value; and transmitting information indicating the slave-side adjustment value to the master device 2A.

Figure 7:
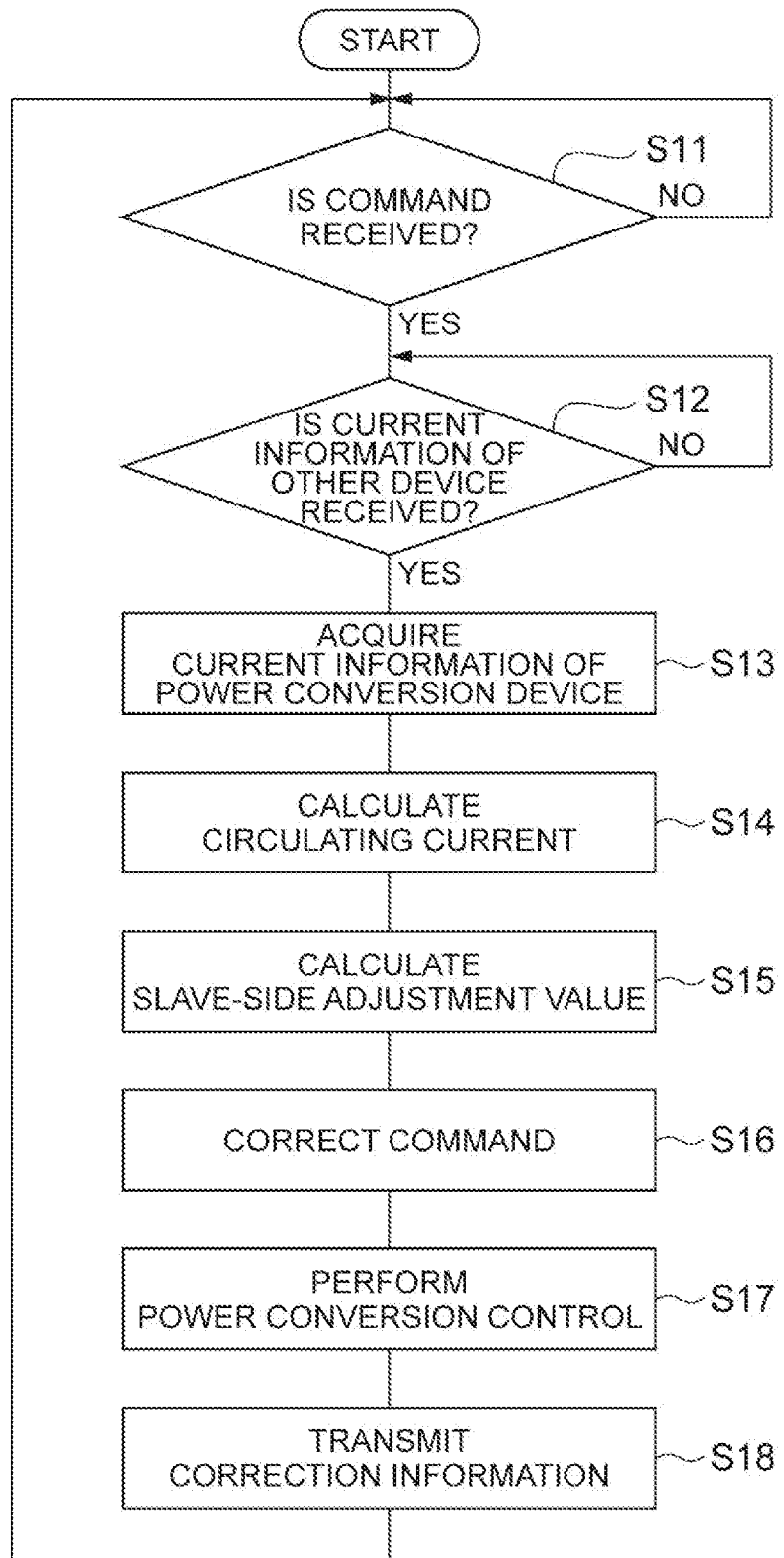
FIG. 7 is a flowchart illustrating an example slave mode control procedure.

FIG. 7 is a flowchart illustrating an example slave mode control procedure executed by the control circuitry 100. In operation S11, the command reception unit 131 waits until it receives a command value from the command transmission unit 124 of the master device 2A. In operation S12, the current information reception unit 132 waits until it receives information indicating the current generated in the secondary side by the power conversion circuitry 10 of the master device 2A from the current information transmission unit 128 of the master device 2A.

In operation S13, the circulating current calculation unit 133 acquires information indicating the current (the slave current) generated in the secondary side by the power conversion circuitry 10 of the power conversion device 2 from the power conversion control unit 114 of the power conversion device 2. In operation S14, the circulating current calculation unit 133 calculates the circulating current based on the difference between the slave current and the current (the master current) indicated by the information received by the current information reception unit 132. In operation S15, the adjustment value calculation unit 134 calculates a slave-side adjustment value based on the circulating current calculated by the circulating current calculation unit 133.

In operation S16, the command correction unit 135 adds the slave-side adjustment value calculated by the adjustment value calculation unit 134 to the command value received by the command reception unit 131, thereby correcting the command value for the power conversion circuitry 10 of the power conversion device 2. In operation S17, the command correction unit 135 outputs the corrected command value to the power conversion control unit 114 of the power conversion device 2. In response to the output of the command value, the power conversion control unit 114 controls the power conversion circuitry 10 such that the power on the power source PS side is converted into the power on the load LD side according to the command value.

In operation S18, the correction information transmission unit 136 transmits information indicating the slave-side adjustment value calculated by the adjustment value calculation unit 134 to the correction information reception unit 126 of the master device 2A. Then, the control circuitry 100 returns the process to operation S11. Thereafter, the operation of receiving the command value from the master device 2A, the operation of correcting the received command value and controlling the power conversion circuitry 10 by the corrected command value, and the operation of transmitting the correction information (information indicating the slave-side adjustment value) to the master device 2A are repeated.

Example Procedure of Selecting Control Mode

Figure 8:
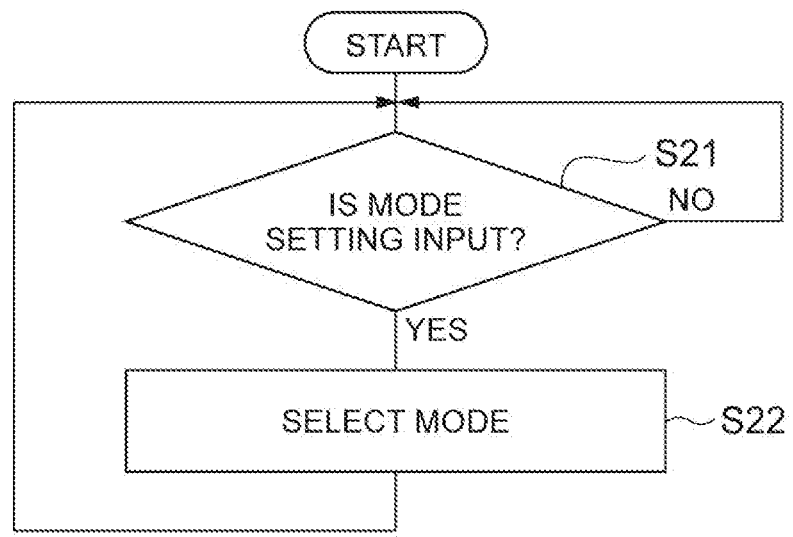
FIG. 8 is a flowchart illustrating an example control mode selecting procedure.

As illustrated in FIG. 8, the control circuitry 100 executes operations S21 and S22. In operation S21, the mode selecting unit 111 waits for an input for setting the control mode by the user. In operation S22, the mode selecting unit 111 sets the control mode of the power conversion circuitry 10 to either the master mode or the slave mode according to the user-input, and stores the setting result in the mode storage unit 112. The control circuitry 100 repeats the above processes.

As described above, the power conversion device 2 may include: the power conversion circuitry 10 that converts a power of primary side into a power of secondary side according to a command value; the command generation unit 121 that generates a command value for the power conversion circuitry 10; the limiter 123 that limits the command value to or below a prescribed upper limit; the command transmission unit 124 that transmits the command value limited by the limiter 123 to another device including a power conversion circuitry 10 connected in parallel to the power conversion circuitry 10 of the power conversion device 2; the correction information reception unit 126 that receives, from the other device, information indicating a slave-side adjustment value added to the command value in the other device; and the upper limit changing unit 127 that changes the upper limit so as to reduce a margin of the upper limit for the maximum command value the power conversion circuitry 10 is able to follow and the slave-side adjustment value. The upper limit changing unit 127 may increase the upper limit so that the difference between the margin and the slave-side adjustment value is reduced, when the margin is greater than the slave-side adjustment value. The upper limit changing unit 127 may decrease the upper limit so that the difference between the margin and the slave-side adjustment value is reduced, when the margin is smaller than the slave-side adjustment value.

In order to improve stability in the outputs of the plurality of power conversion devices 2 in parallel operation, an allowance for the slave-side adjustment value may be added in the other device. On the other hand, if an excessive margin is provided between the maximum command value and the upper limit in order to ensure the allowance for the slave-side adjustment value to be added, the voltage utilization in each power conversion device 2 becomes excessively small.

In contrast, if a margin is set based on the slave-side adjustment value added to the command value in the other device, the voltage utilization is maximized within a range in which the allowance for the slave-side adjustment value to be added can be maintained. Therefore, this is effective for achieving stability in output of a plurality of power conversion devices 2 in parallel operation and improving the voltage utilization in each power conversion device 2.

The command transmission unit 124 may transmit the command value limited by the limiter 123 to a plurality of the other devices, the correction information reception unit 126 may receive information indicating the slave-side adjustment value from the plurality of the other devices, and the upper limit changing unit may change the upper limit so as to reduce the difference between the margin and the maximum slave-side adjustment value indicated by the information received by the correction information reception unit 126. In this case, in a system in which the power conversion device 2 is operated in parallel with a plurality of other power conversion devices 2, stability in outputs of the plurality of power conversion devices 2 in parallel operation and improvement of the voltage utilization can be more reliably achieved.

The power conversion device 2 may further include: a command reception unit 131 that receives a command value from the other device as a command value for the power conversion circuitry 10 of the power conversion device 2; a command correction unit 135 that corrects the command value for the power conversion circuitry 10 of the power conversion device 2 by adding a slave-side adjustment value to the command value received by the command reception unit 131; a correction information transmission unit 136 that transmits information indicating the slave-side adjustment value to the other device; a master mode control unit 120 that controls the power conversion circuitry 10 of the power conversion device 2 using the command generation unit 121, the limiter 123, the command transmission unit 124, the correction information reception unit 126, and the upper limit changing unit 127; a slave mode control unit 130 that controls the power conversion circuitry 10 of the power conversion device 2 using the command reception unit 131, the command correction unit 135, and the correction information transmission unit 136; and a mode selecting unit 111 that selects control by the master mode control unit 120 or control by the slave mode control unit 130 in response to an input performed by a user. In this case, the device configuration is shared between the master side and the slave side, whereby the manufacturing efficiency of the power conversion device 2 can be improved.

The power conversion device 2 may further include: the current information reception unit 132 that receives, from the other device, information indicating a current flowing through the secondary side of the power conversion circuitry 10 of the other device; the circulating current calculation unit 133 that calculates a circulating current based on the difference between the current generated in the secondary side by the power conversion circuitry 10 of the power conversion device 2 and the current indicated by the information received by the current information reception unit 132; and the adjustment value calculation unit 134 that calculates the slave-side adjustment value based on the circulating current calculated by the circulating current calculation unit 133, wherein the slave mode control unit 130 may control the power conversion circuitry 10 of the power conversion device 2 further using the current information reception unit 132, the circulating current calculation unit 133, and the adjustment value calculation unit 134. In this case, suppression of the circulating current and improvement of voltage utilization can be both achieved.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

In some examples described above, a common power conversion device 2 is selectively used for the master device 2A and the slave device 2B due to setting. However, in other examples, the power conversion system 1 may include a master device 2A dedicated to the master mode and a slave device 2B dedicated to the slave mode. In this case, the master device 2A does not have the slave mode control unit 130, and the slave device 2B does not have the master mode control unit 120.

Regarding the above-described embodiments, the followings are appended.

(Appendix 1) A power conversion device comprising:

a first power conversion unit having a primary side and a secondary side configured to convert primary-side power into secondary-side power;

a command generation unit configured to generate a command value associated with the secondary-side power;

a limiter configured to calculate a limited command value by modifying the command value so that the command value is equal to or less than a secondary-side limit, wherein the first power conversion unit is controlled based on the limited command value;

a command transmission unit configured to transmit the limited command value to a second power conversion device comprising a second power conversion unit connected in parallel to the first power conversion unit;

a correction information reception unit configured to receive, from the second power conversion device, information indicating an adjustment value, wherein the adjustment value is added to the limited command value for controlling the second power conversion unit; and an upper limit changing unit configured to modify the secondary-side limit based on a difference between a primary-side limit associated with the primary-side power and the adjustment value.

(Appendix 2) The power conversion device according to appendix 1, wherein the command transmission unit transmits the limited command value to a plurality of power conversion devices including the second power conversion device, each of the plurality of power conversion devices comprising a power conversion unit connected in parallel to the first power conversion unit, the correction information reception unit receives information indicating adjustment values from the plurality of power conversion devices, each of the adjustment values being a value added to the limited command value for controlling the power conversion unit of one of the plurality of power conversion devices, and the upper limit changing unit selects a maximum value of the adjustment values as the adjustment value and modifies the secondary-side limit based on the difference between the primary-side limit and the adjustment value.

(Appendix 3) The power conversion device according to appendix 1 or 2, wherein, when a difference between the primary-side limit and the secondary-side limit is greater than the adjustment value, the upper limit changing unit increases the secondary-side limit.

(Appendix 4) The power conversion device according to appendix 3,
wherein, when the difference between the primary-side limit and the secondary-side limit is smaller than the adjustment value, the upper limit changing unit decreases the secondary-side limit.

(Appendix 5) The power conversion device according to any one of appendices 1 to 4, further comprising:
an adjustment value calculation unit configured to calculate a self adjustment value based on a current generated by the first power conversion unit in the secondary side; and
a command correction unit configured to calculate an adjusted command value by adding the self adjustment value to the limited command value wherein the first power conversion unit is controlled based on the adjusted command value,
wherein the upper limit changing unit modifies the secondary-side limit based on a comparison between the adjustment value and the self adjustment value, wherein the secondary-side limit is modified based on the difference between the primary-side limit and the adjustment value, when the adjustment value is greater than the self adjustment value, and wherein the secondary-side limit is modified based on a difference between the primary-side limit and the self adjustment value, when the self adjustment value is greater than the adjustment value.

(Appendix 6) The power conversion device according to any one of appendices 1 to 4, further comprising:
a master mode control unit configured to control the first power conversion unit based on the limited command value;
a slave mode control unit configured to control the first power conversion unit based on a master command value generated in a master power conversion device comprising a master power conversion unit connected in parallel to the first power conversion unit; and
a mode selecting unit configured to switch between control by the master mode control unit and control by the slave mode control unit in response to a user-input,
wherein the master mode control unit comprises the command generation unit, the limiter, the command transmission unit, the correction information reception unit, and the upper limit changing unit.

(Appendix 7) The power conversion device according to appendix 6, wherein the slave mode control unit comprises:
a command reception unit configured to receive the master command value from the master power conversion device;
a command correction unit configured to calculate a slave command value by adding a slave adjustment value to the master command value wherein the first power conversion unit is controlled based on the slave command value; and
a correction information transmission unit configured to transmit information indicating the slave adjustment value to the master power conversion device.

(Appendix 8) The power conversion device according to appendix 7, wherein the slave mode control unit further comprises:
a current information reception unit configured to receive, from the master power conversion device, master current information indicating a current generated by the master power conversion unit in the secondary side;
a circulating current calculation unit configured to calculate a circulating current based on a difference between a current generated by the first power conversion unit in the secondary side and a current indicated by the master current information; and a slave adjustment value calculation unit configured to calculate the slave adjustment value based on the circulating current.

(Appendix 9) The power conversion device according to any one of appendices 6 to 8, wherein the master mode control unit further comprises:
a self adjustment value calculation unit configured to calculate a self adjustment value based on a current generated by the first power conversion unit in the secondary side; and
a command correction unit configured to calculate adjusted command value by adding the self adjustment value to the limited command value wherein the first power conversion unit is controlled based on the adjusted command value, and
the upper limit changing unit modifies the secondary-side limit based on a comparison between the adjustment value and the self adjustment value, wherein the secondary-side limit is modified based on the difference between the primary-side limit and the adjustment value, when the adjustment value is greater than the self adjustment value, and wherein the secondary-side limit is modified based on a difference between the primary-side limit and the self adjustment value, when the self adjustment value is greater than the adjustment value.

(Appendix 10) A power conversion system comprising:
the power conversion device according to any one of appendices 1 to 4; and
the second power conversion device.

(Appendix 11) A power conversion system according to appendix 10, wherein the second power conversion device further comprises:
a command reception unit configured to receive the limited command value transmitted from the command transmission unit of the first power conversion device,
a command correction unit configured to calculate a slave command value by adding the adjustment value to the limited command value wherein the first power conversion unit is controlled based on the slave command value, and
a correction information transmission unit configured to transmit the information indicating the adjustment value to the first power conversion device.

(Appendix 12) The power conversion system according to appendix 11, wherein the second power conversion device further comprises:
a current information reception unit configured to receive, from the first power conversion device, master current information indicating a current generated by the first power conversion unit in the secondary side;
a circulating current calculation unit configured to calculate a circulating current based on a difference between a current generated by the second power conversion unit in the secondary side and a current indicated by the master current information; and a slave adjustment value calculation unit configured to calculate the adjustment value based on the circulating current.

(Appendix 13) The power conversion system according to appendix 11 or 12, wherein the first power conversion device further comprises:
a self adjustment value calculation unit configured to calculate a self adjustment value based on a current generated by the first power conversion unit in the secondary side; and
a command correction unit configured to calculate adjusted command value by adding the self adjustment value to the limited command value wherein the first power conversion unit is controlled based on the adjusted command value, and the upper limit changing unit modifies the secondary-side limit based on a comparison between the adjustment value and the self adjustment value, wherein the secondary-side limit is modified based on the difference between the primary-side limit and the adjustment value, when the adjustment value is greater than the self adjustment value, and wherein the secondary-side limit is modified based on a difference between the primary-side limit and the self adjustment value, when the self adjustment value is greater than the adjustment value.

(Appendix 14) A power conversion method for controlling a first power conversion unit having a primary side and a secondary side configured to convert primary-side power into secondary-side power comprising:

generating a command value associated with the secondary-side power;

calculating a limited command value by modifying the command value so that the command value is equal to or less than a secondary-side limit, wherein the first power conversion unit is controlled based on the limited command value;

transmitting the limited command value to a second power conversion device comprising a second power conversion unit connected in parallel to the first power conversion unit;

receiving, from the second power conversion device, information indicating an adjustment value, wherein the adjustment value is added to the limited command value for controlling the second power conversion unit; and modifying the secondary-side limit based on a difference between a primary-side limit associated with the primary-side power and the adjustment value.

What is claimed is:

1. A power conversion device comprising:
   a first power conversion circuitry having a primary side and a secondary side configured to convert primary-side power into secondary-side power; and
   a control circuitry configured to:
   generate a command value associated with the secondary-side power;
   calculate a limited command value by modifying the command value so that the command value is equal to or less than a secondary-side limit, wherein the first power conversion circuitry is controlled based on the limited command value;
   transmit the limited command value to a second power conversion device comprising a second power conversion circuitry connected in parallel to the first power conversion circuitry;
   receive, from the second power conversion device, information indicating an adjustment value, wherein the adjustment value is added to the limited command value for controlling the second power conversion circuitry; and
   modify the secondary-side limit based on a difference between a primary-side limit associated with the primary-side power and the adjustment value.

2. The power conversion device according to claim 1, wherein the control circuitry is further configured to:
   transmit the limited command value to a plurality of power conversion devices including the second power conversion device, each of the plurality of power conversion devices comprising a power conversion circuitry connected in parallel to the first power conversion circuitry;
   receive information indicating adjustment values from the plurality of power conversion devices, each of the adjustment values being a value added to the limited command value for controlling the power conversion circuitry of one of the plurality of power conversion devices; and
   select a maximum value of the adjustment values as the adjustment value and modify the secondary-side limit based on the difference between the primary-side limit and the adjustment value.

3. The power conversion device according to claim 1, wherein the control circuitry is further configured to increase the secondary-side limit when a difference between the primary-side limit and the secondary-side limit is greater than the adjustment value.

4. The power conversion device according to claim 3, wherein the control circuitry is further configured to decrease the secondary-side limit when the difference between the primary-side limit and the secondary-side limit is smaller than the adjustment value.

5. The power conversion device according to claim 1, wherein the control circuitry is further configured to:
   calculate a self adjustment value based on a current generated by the first power conversion circuitry in the secondary side;
   calculate an adjusted command value by adding the self adjustment value to the limited command value wherein the first power conversion circuitry is controlled based on the adjusted command value; and
   modify the secondary-side limit based on a comparison between the adjustment value and the self adjustment value, wherein the secondary-side limit is modified based on the difference between the primary-side limit and the adjustment value, when the adjustment value is greater than the self adjustment value, and wherein the secondary-side limit is modified based on a difference between the primary-side limit and the self adjustment value, when the self adjustment value is greater than the adjustment value.

6. The power conversion device according to claim 1, wherein the control circuitry is further configured to:
   select a master mode control in which the first power conversion circuitry is controlled based on the limited command value, or a slave mode control in which the first power conversion circuitry is controlled based on a master command value generated in a master power conversion device comprising a master power conversion circuitry connected in parallel to the first power conversion circuitry in response to a user-input,
   wherein the master mode control comprises generating the command value, calculating the limited command value, transmitting the limited command value to the second power conversion device, receiving the information indicating the adjustment value from the second power conversion device, and modifying the secondary-side limit based on the difference between the primary-side limit and the adjustment value.

7. The power conversion device according to claim 6, wherein the slave mode control comprises:
   receiving the master command value from the master power conversion device;
   calculating a slave command value by adding a slave adjustment value to the master command value wherein the first power conversion circuitry is controlled based on the slave command value; and
   transmitting information indicating the slave adjustment value to the master power conversion device.

8. The power conversion device according to claim 7, wherein the slave mode control further comprises:
receiving, from the master power conversion device, master current information indicating a current generated by the master power conversion circuitry in the secondary side;
calculating a circulating current based on a difference between a current generated by the first power conversion circuitry in the secondary side and a current indicated by the master current information; and
calculating the slave adjustment value based on the circulating current.

9. The power conversion device according to claim 6, wherein the master mode control further comprises:
calculating a self adjustment value based on a current generated by the first power conversion circuitry in the secondary side; and
calculating adjusted command value by adding the self adjustment value to the limited command value wherein the first power conversion circuitry is controlled based on the adjusted command value, and
the control circuitry is further configured to modify the secondary-side limit based on a comparison between the adjustment value and the self adjustment value, wherein the secondary-side limit is modified based on the difference between the primary-side limit and the adjustment value, when the adjustment value is greater than the self adjustment value, and wherein the secondary-side limit is modified based on a difference between the primary-side limit and the self adjustment value, when the self adjustment value is greater than the adjustment value.

10. A power conversion system comprising:
the power conversion device according to claim 1; and
the second power conversion device.

11. A power conversion system according to claim 10, wherein the second power conversion device further comprises a second control circuitry configured to:
receive the limited command value transmitted from the power conversion device;
calculate a slave command value by adding the adjustment value to the limited command value wherein the first power conversion circuitry is controlled based on the slave command value, and
transmit the information indicating the adjustment value to the power conversion device.

12. The power conversion system according to claim 11, wherein the second control circuitry is further configured to:
receive, from the power conversion device, master current information indicating a current generated by the first power conversion circuitry in the secondary side;
calculate a circulating current based on a difference between a current generated by the second power conversion circuitry in the secondary side and a current indicated by the master current information; and
calculate the adjustment value based on the circulating current.

13. The power conversion system according to claim 11, wherein the control circuitry is further configured to:
calculate a self adjustment value based on a current generated by the first power conversion circuitry in the secondary side; and
calculate adjusted command value by adding the self adjustment value to the limited command value wherein the first power conversion circuitry is controlled based on the adjusted command value, and
modify the secondary-side limit based on a comparison between the adjustment value and the self adjustment value, wherein the secondary-side limit is modified based on the difference between the primary-side limit and the adjustment value, when the adjustment value is greater than the self adjustment value, and wherein the secondary-side limit is modified based on a difference between the primary-side limit and the self adjustment value, when the self adjustment value is greater than the adjustment value.

14. The power conversion device according to claim 1, wherein the command value is associated with a voltage of the secondary-side power, and the primary-side limit is associated with a voltage of the primary-side power.

15. The power conversion device according to claim 14, wherein the command value includes a voltage command value, and the primary-side limit includes a voltage limit of the primary-side power.

16. The power conversion device according to claim 15, wherein the command value is a voltage command value, and the primary-side limit is a voltage limit of the primary-side power.

17. A power conversion method for controlling a first power conversion circuitry having a primary side and a secondary side configured to convert primary side power into secondary-side power comprising:
generating a command value associated with the secondary-side power;
calculating a limited command value by modifying the command value so that the command value is equal to or less than a secondary-side limit, wherein the first power conversion circuitry is controlled based on the limited command value;
transmitting the limited command value to a second power conversion device comprising a second power conversion circuitry connected in parallel to the first power conversion circuitry;
receiving, from the second power conversion device, information indicating an adjustment value, wherein the adjustment value is added to the limited command value for controlling the second power conversion circuitry; and
modifying the secondary-side limit based on a difference between a primary-side limit associated with the primary-side power and the adjustment value.

18. The power conversion method according to claim 17 wherein transmitting the limited command value includes transmitting the limited command value to a plurality of power conversion devices including the second power conversion device, each of the plurality of power conversion devices comprising a power conversion circuitry connected in parallel to the first power conversion circuitry, and
receiving the information indicating the adjustment value includes receiving information indicating adjustment values from the plurality of power conversion devices, each of the adjustment values being a value added to the limited command value for controlling the power conversion circuitry of one of the plurality of power conversion devices, and
modifying the secondary-side limit includes selecting a maximum value of the adjustment values as the adjustment value and modifying the secondary-side limit based on the difference between the primary-side limit and the adjustment value.

19. The method according to claim 17, wherein the command value is associated with a voltage of the secondary-side power, and the primary-side limit is associated with a voltage of the primary-side power.

20. The power conversion device according to claim 19, wherein the command value includes a voltage command value, and the primary-side limit includes a voltage limit of the primary-side power.

21. The method according to claim 20, wherein the command value is a voltage command value, and the primary-side limit is a voltage limit of the primary-side power.

22. A non-transitory memory device for controlling a first power conversion circuitry having a primary side and a secondary side configured to convert primary-side power into secondary-side power, the non-transitory memory device having instructions stored thereon that, in response to execution by a processing device, cause the processing device to:
   generate a command value associated with the secondary-side power;
   calculate a limited command value by modifying the command value so that the command value is equal to or less than a secondary-side limit, wherein the first power conversion circuitry is controlled based on the limited command value;
   transmit the limited command value to a second power conversion device comprising a second power conversion circuitry connected in parallel to the first power conversion circuitry;
   receive, from the second power conversion device, information indicating an adjustment value, wherein the adjustment value is added to the limited command value for controlling the second power conversion circuitry; and
   modify the secondary-side limit based on a difference between a primary-side limit associated with the primary-side power and the adjustment value.

23. The non-transitory memory device according to claim 22 further configured to cause the processing device to:
   transmit the limited command value to a plurality of power conversion devices including the second power conversion device, each of the plurality of power conversion devices comprising a power conversion circuitry connected in parallel to the first power conversion circuitry;
   receive information indicating adjustment values from the plurality of power conversion devices, each of the adjustment values being a value added to the limited command value for controlling the power conversion circuitry of one of the plurality of power conversion devices; and
   select a maximum value of the adjustment values as the adjustment value and modify the secondary-side limit based on the difference between the primary-side limit and the adjustment value.

24. The non-transitory memory device according to claim 22 further configured to cause the processing device to:
   calculate a self adjustment value based on a current generated by the first power conversion circuitry in the secondary side;
   calculate adjusted command value by adding the self adjustment value to the limited command value wherein the first power conversion circuitry is controlled based on the adjusted command value; and
   modify the secondary-side limit based on a comparison between the adjustment value and the self adjustment value, wherein the secondary-side limit is modified based on the difference between the primary-side limit and the adjustment value, when the adjustment value is greater than the self adjustment value, and the secondary-side limit is modified based on a difference between the primary-side limit and the self adjustment value, when the self adjustment value is greater than the adjustment value.

25. The non-transitory memory device according to claim 22 further configured to cause the processing device to:
   select a master mode control in which the first power conversion circuitry is controlled based on the limited command value, or a slave mode control in which the first power conversion circuitry is controlled based on a master command value generated in a master power conversion device comprising a master power conversion circuitry connected in parallel to the first power conversion circuitry,
   wherein the master mode control comprises generating the command value, calculating the limited command value, transmitting the limited command value to the second power conversion device, receiving the information indicating the adjustment value from the second power conversion device, and modifying the secondary-side limit based on the difference between the primary-side limit and the adjustment value.

26. The non-transitory memory device according to claim 25 wherein the slave mode control comprises:
   receiving the master command value from the master power conversion device;
   calculating a slave command value by adding a slave adjustment value to the master command value wherein the first power conversion circuitry is controlled based on the slave command value; and
   transmitting information indicating the slave adjustment value to the master power conversion device.

27. The non-transitory memory device according to claim 22, wherein the command value is associated with a voltage of the secondary-side power, and the primary-side limit is associated with a voltage of the primary-side power.

28. The non-transitory memory device according to claim 27, wherein the command value includes a voltage command value, and the primary-side limit includes a voltage limit of the primary-side power.

29. The non-transitory memory device according to claim 28, wherein the command value is a voltage command value, and the primary-side limit is a voltage limit of the primary-side power.

* * * * *